US011913394B1

(12) United States Patent
Dudar et al.

(10) Patent No.: US 11,913,394 B1
(45) Date of Patent: Feb. 27, 2024

(54) METHOD AND SYSTEM FOR LOWERING VEHICLE EMISSIONS USING ACTIVE PRE-CHAMBER IGNITION

(71) Applicant: Ford Global Technologies, LLC, Dearborn, MI (US)

(72) Inventors: Aed Dudar, Canton, MI (US); Thomas Leone, Ypsilanti, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 18/305,603

(22) Filed: Apr. 24, 2023

(51) Int. Cl.
*F02D 41/00* (2006.01)
*F02D 41/38* (2006.01)
*F02B 19/10* (2006.01)
*F02B 19/12* (2006.01)

(52) U.S. Cl.
CPC ...... *F02D 41/0042* (2013.01); *F02B 19/1023* (2013.01); *F02B 19/12* (2013.01); *F02D 41/38* (2013.01); *F02D 2041/389* (2013.01); *F02D 2200/06* (2013.01)

(58) Field of Classification Search
CPC ................ F02D 41/0042; F02D 41/38; F02D 2041/389; F02D 2200/06; F02B 19/1023; F02B 19/12
See application file for complete search history.

(56) References Cited

U.S. PATENT DOCUMENTS

| | | | | |
|---|---|---|---|---|
| 10,968,847 B2 * | 4/2021 | Ikeda | F01N 3/101 | |
| 2005/0193720 A1 * | 9/2005 | Surnilla | F02D 13/06 | 60/285 |
| 2005/0274353 A1 * | 12/2005 | Okubo | F02M 63/029 | 123/299 |
| 2005/0274368 A1 * | 12/2005 | Itakura | F02D 41/0042 | 123/698 |
| 2007/0186915 A1 * | 8/2007 | Annoura | F02D 41/0045 | 123/698 |
| 2008/0148718 A1 * | 6/2008 | Hermansson | F02D 41/0087 | 60/285 |
| 2011/0048393 A1 * | 3/2011 | Akita | F02D 41/0032 | 123/704 |
| 2014/0041362 A1 * | 2/2014 | Ulrey | F02D 37/02 | 60/287 |
| 2014/0230793 A1 * | 8/2014 | Mashiki | F02D 41/40 | 123/478 |
| 2015/0040845 A1 * | 2/2015 | Chiera | F02B 19/12 | 123/445 |
| 2015/0369148 A1 * | 12/2015 | Mano | F02M 25/0854 | 123/521 |
| 2016/0230707 A1 * | 8/2016 | Tanaka | F02D 41/0235 | |
| 2016/0237926 A1 * | 8/2016 | Tanaka | F02D 41/0235 | |
| 2017/0363055 A1 * | 12/2017 | Dudar | F02M 25/0836 | |
| 2019/0128198 A1 * | 5/2019 | Ban | F02D 41/0045 | |

* cited by examiner

*Primary Examiner* — Joseph J Dallo
(74) *Attorney, Agent, or Firm* — Vincent Mastrogiacomo; McCoy Russell LLP

(57) ABSTRACT

Methods and systems are presented for improving operation of an engine that includes an evaporative emissions system. In one example, the methods and systems adjust an amount of fuel that is delivered to a pre-chamber of an igniter in response to purging fuel vapors and/or an indication of hydrocarbon breakthrough of a carbon filled fuel vapor storage canister.

20 Claims, 5 Drawing Sheets

METHOD AND SYSTEM FOR LOWERING VEHICLE EMISSIONS USING ACTIVE PRE-CHAMBER IGNITION

FIELD

The present description relates generally to methods and systems for lowering emissions of an internal combustion engine.

BACKGROUND/SUMMARY

A vehicle may include a fuel vapor emissions control system that utilizes a carbon filled fuel vapor storage canister. The carbon filled fuel vapor storage canister may store fuel vapors when liquid fuel in a fuel tank is heated via diurnal heating. The carbon filled fuel vapor storage canister may also store fuel vapors when the fuel tank is being filled so that the fuel vapors do not escape to atmosphere. The carbon filled fuel vapor storage canister may be purged of fuel vapors from time to time so that the fuel vapors do not overflow the carbon filled fuel vapor storage canister. The fuel vapors may be purged from the carbon filled fuel vapor storage canister by opening a valve and drawing the fuel vapors into an engine where they may be combusted. However, if a rate at which fuel vapors are generated and supplied to the carbon filled fuel vapor storage canister exceeds the rate that fuel vapors are purged from the carbon filled canister, fuel vapor may be released to atmosphere.

The inventors herein have recognized the above-mentioned issue and have developed a method for operating a vehicle, comprising: via a controller, increasing an amount of fuel that is supplied via an igniter in response to purging fuel vapors from a carbon filled canister, and where the igniter includes a pre-chamber.

By increasing an amount of fuel that is supplied to an igniter that includes a pre-chamber in response to purging of fuel vapors from a carbon filled canister, it may be possible to provide the technical result of improving combustion stability while purging an evaporative emissions system so that flow through a carbon filled canister may be increased. In particular, the igniter may increase a range of air-fuel ratios at which combustion stability may be acceptable. Further, it may be possible to increase flow rates of hydrocarbons from a carbon filled canister during canister purging so that a canister may be emptied sooner than if the amount of fuel that is supplied to the igniter is not increased.

The present description may provide several advantages. In particular, the approach may reduce an amount of time it takes to purge a carbon filled canister of fuel vapors. Additionally, the approach may improve combustion stability during purging of fuel vapors. Further, the approach may reduce evaporative emissions by increasing fuel vapor flow during conditions of hydrocarbon breakthrough of the carbon filled canister.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
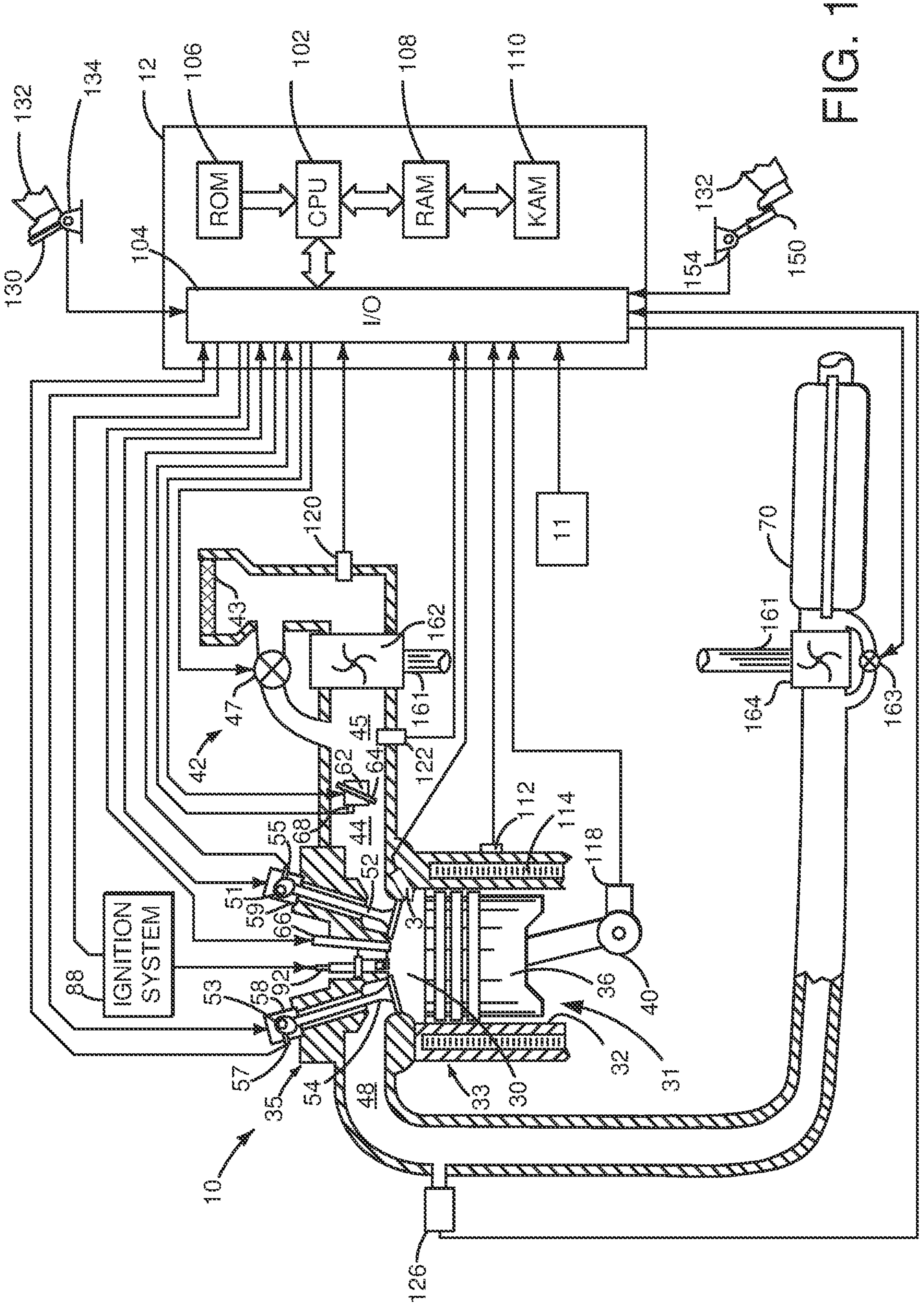
FIG. 1 shows an example engine to which an evaporative emissions system may be coupled.
Figure 3:
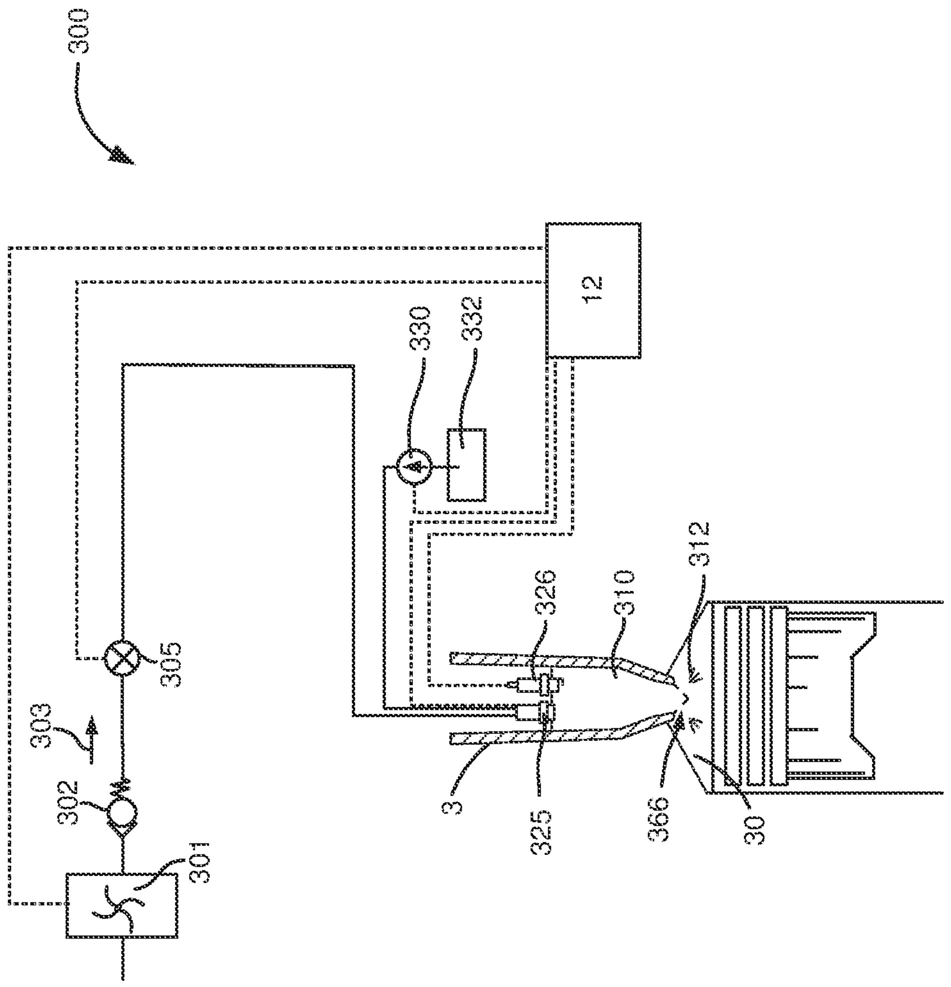
FIG. 3 shows an example igniter that may be supplied with fuel and air.
Figure 4:
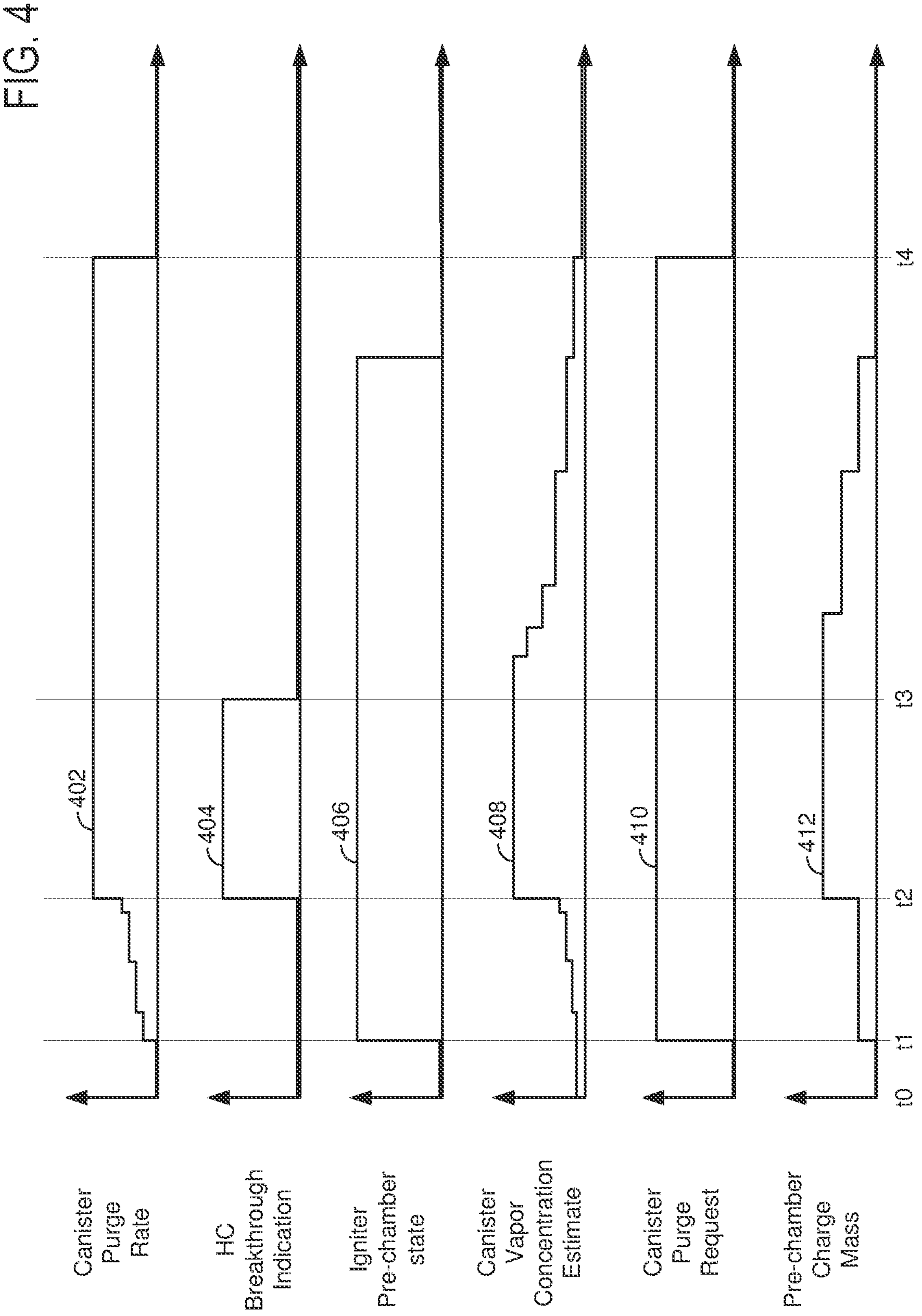
FIG. 4 shows an example vehicle operating sequence according to the method of FIG. 5.
Figure 5:
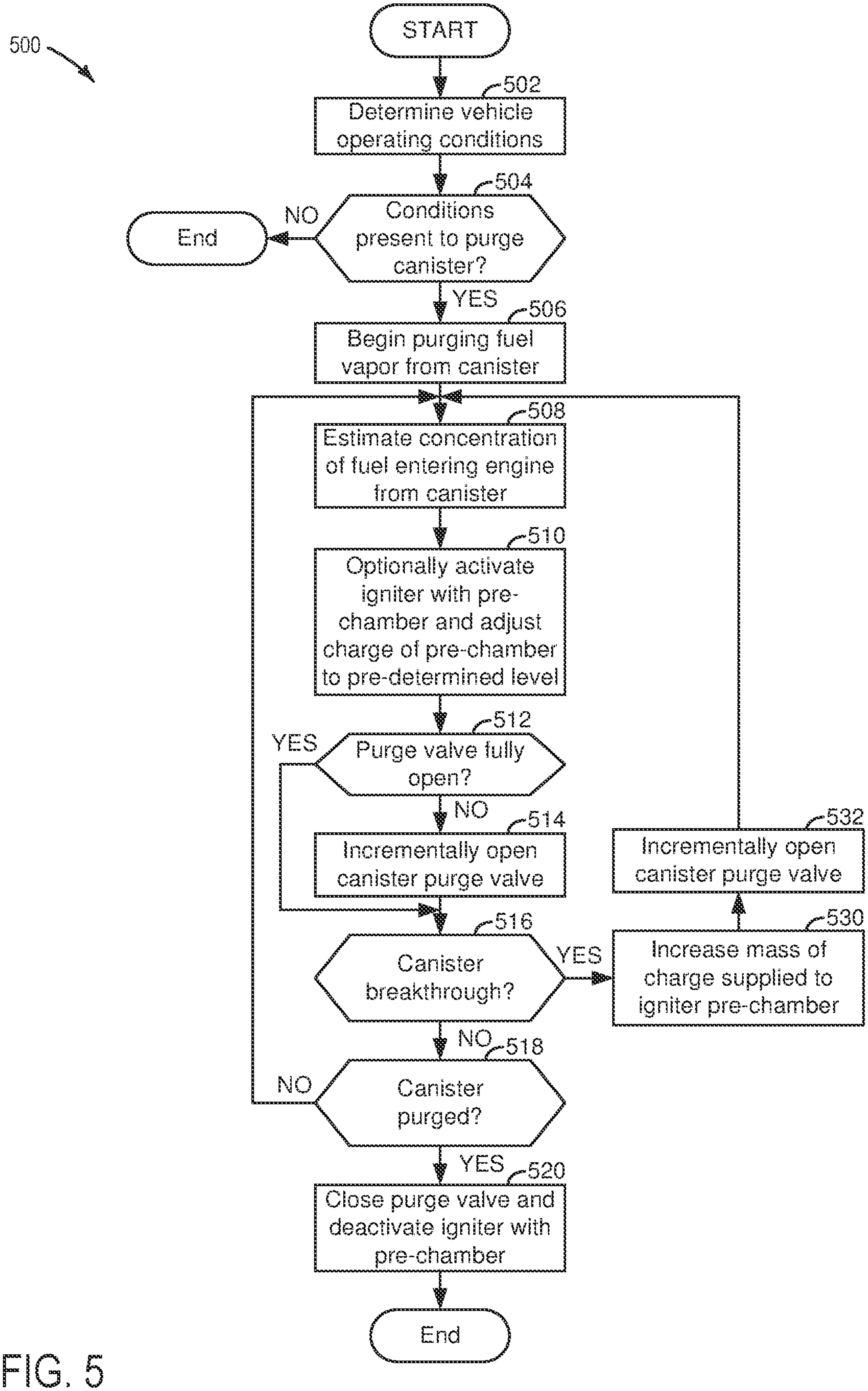
FIG. 5 shows an example method for operating a vehicle and its evaporative emissions system.

The following description relates to systems and methods for operating a vehicle and an evaporative emissions system. The vehicle may be a hybrid vehicle or a non-hybrid vehicle. The vehicle may include an engine of the type that is shown in FIG. 1. An evaporative emissions system of the type shown in FIG. 2 may be coupled to the engine. An example igniter of the type that may be operated to improve combustion stability during purging of fuel vapors from a carbon filled fuel vapor storage canister is shown in FIG. 3. An engine and fuel vapor emissions control system may be operated as shown in FIG. 4 to reduce hydrocarbon emissions and improve combustion stability. Finally, a method for operating a vehicle is shown in FIG. 5. The method may improve combustion stability during purging of fuel vapors from a carbon filled canister.

Referring to FIG. 1, internal combustion engine 10, comprising a plurality of cylinders, one cylinder of which is shown in FIG. 1, is controlled by electronic engine controller 12. The controller 12 receives signals from the various sensors shown in FIGS. 1 and 2. The controller may employ the actuators shown in FIGS. 1 and 2 to adjust engine operation based on the received signals and instructions stored in memory of controller 12.

Engine 10 is comprised of cylinder head 35 and block 33, which include combustion chamber 30 and cylinder walls 32. Piston 36 is positioned therein and reciprocates via a connection to crankshaft 40. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57. Intake valve 52 may be selectively activated and deactivated by valve activation device 59. Exhaust valve 54 may be selectively activated and deactivated by valve activation device 58. The intake and exhaust valves may be deactivated in a closed position so that the intake and exhaust valves do not open during a cycle of the engine (e.g., four strokes). Valve activation devices 58 and 59 may be electro-mechanical devices.

Igniter 3 is shown extending into combustion chamber 30 and it may receive air and fuel. Igniter 3 also includes a spark plug (not shown) for generating spark and combusting air-fuel mixtures formed in a pre-chamber of igniter 3. In some examples, igniter 3 may be incorporated into cylinder head 35. A more detailed view of igniter 3 is shown in FIG. 3.

Fuel injector 66 is shown protruding into combustion chamber 30 and it is positioned to inject fuel directly into cylinder 31, which is known to those skilled in the art as direct injection. Fuel injector 66 delivers liquid fuel in proportion to the pulse width from controller 12. Fuel is delivered to fuel injector 66 by a fuel system (not shown) including a fuel tank, fuel pump, and fuel rail (not shown). In one example, a high pressure, dual stage, fuel system may be used to generate higher fuel pressures.

In addition, intake manifold 44 is shown communicating with turbocharger compressor 162 and engine air intake 42. In other examples, compressor 162 may be a supercharger compressor. Shaft 161 mechanically couples turbocharger turbine 164 to turbocharger compressor 162. Optional electronic throttle 62 adjusts a position of throttle plate 64 to control air flow from compressor 162 to intake manifold 44. Pressure in boost chamber 45 may be referred to a throttle inlet pressure since the inlet of throttle 62 is within boost chamber 45. The throttle outlet is in intake manifold 44. In some examples, throttle 62 and throttle plate 64 may be positioned between intake valve 52 and intake manifold 44 such that throttle 62 is a port throttle. Compressor recirculation valve 47 may be selectively adjusted to a plurality of positions between fully open and fully closed. Waste gate 163 may be adjusted via controller 12 to allow exhaust gases to selectively bypass turbine 164 to control the speed of compressor 162. Air filter 43 cleans air entering engine air intake 42.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Converter 70 can include multiple catalyst bricks, in one example. In another example, multiple emission control devices, each with multiple bricks, can be used. Converter 70 can be a three-way type catalyst in one example.

Controller 12 is shown in FIG. 1 as a conventional microcomputer including: microprocessor unit 102, input/output ports 104, read-only memory 106 (e.g., non-transitory memory), random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to a driver demand pedal 130 for sensing a demand (e.g., torque or power) applied by human driver 132; a position sensor 154 coupled to brake pedal 150 for sensing a braking demand (e.g., torque) applied by human driver 132, a measurement of engine manifold pressure (MAP) from pressure sensor 122 coupled to intake manifold 44; an engine position sensor from an engine position sensor 118 sensing crankshaft 40 position; a measurement of air mass entering the engine from sensor 120; and a measurement of throttle position from sensor 68. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

Controller 12 may also receive input from human/machine interface 11. A request to start the engine or vehicle may be generated via a human and input to the human/machine interface 11. The human/machine interface may be a touch screen display, pushbutton, key switch or other known device. Controller 12 may also automatically start engine 10 in response to vehicle and engine operating conditions. Automatic engine starting may include starting engine 10 without input from human 132 to a device that is dedicated to receive input from human 132 for the sole purpose of starting and/or stopping rotation of engine 10 (e.g., a key switch or pushbutton). For example, engine 10 may be automatically stopped in response to driver demand torque being less than a threshold and vehicle speed being less than a threshold.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC).

During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion.

During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

Figure 2:
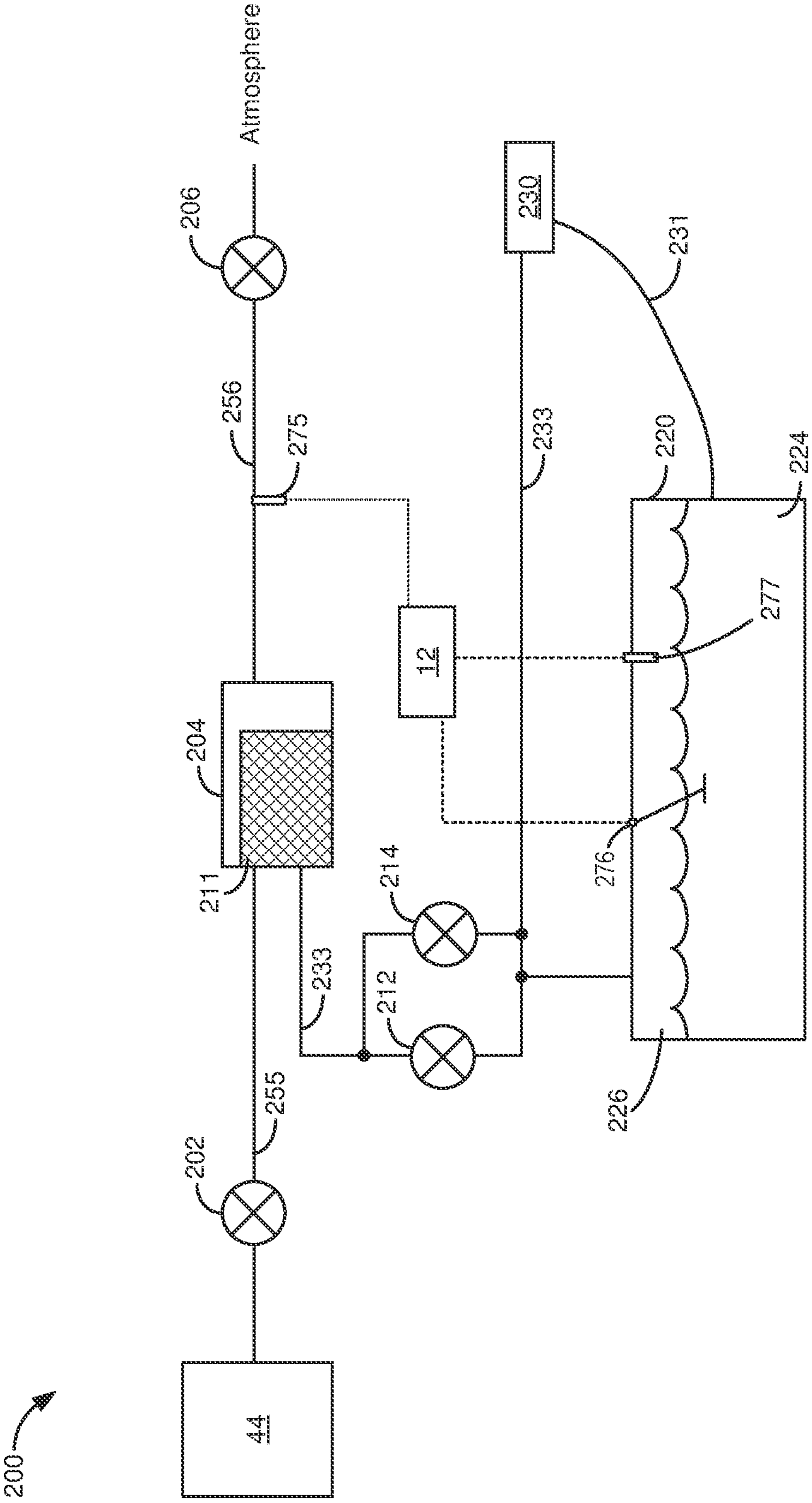
FIG. 2 shows an example evaporative emissions system.

Referring now to FIG. 2, a block diagram of an example evaporative emissions system 200 is shown. Evaporative emissions system 200 includes a canister purge valve 202, a carbon filled fuel vapor storage canister 204, a canister vent valve 206, a fuel tank pressure sensor 277, a fuel tank level sensor 276, a fuel cap 230, a fuel tank pressure control valve 212, a hydrocarbon sensor 275, and a refueling valve 214. In some examples, a leak detection module including a pump and change over valve may replace vent valve 206. Carbon filled fuel vapor storage canister 204 may include activated carbon 211 to store fuel vapors. Fuel tank pressure control valve 212 and refueling valve 214 are shown in fluidic communication with carbon filled fuel vapor storage canister 204 and fuel tank 220 via conduit 233. Fuel may flow from fuel cap 230 to fuel tank 220 via filler neck pipe 231. Carbon filled fuel vapor storage canister 204 may be in selective fluidic communication with intake manifold 44 via conduit 255 and canister purge valve 202.

During refilling of fuel tank 220, the refueling valve 214 and the canister vent valve 206 may be opened so that fuel vapors may exit fuel tank 220, pass though conduit 233, and be stored in carbon filled fuel vapor storage canister 204. Air that has been stripped of hydrocarbons may flow from carbon filled fuel vapor storage canister 204 to atmosphere via conduit or passage 256 and vent valve 206.

Carbon filled fuel vapor storage canister 204 may be purged of fuel vapors by opening canister purge valve 202, fully closing fuel tank pressure control valve 212, fully closing refueling valve 214, and opening canister vent valve 206. In particular, low pressure in engine intake manifold 44 may draw fuel vapors from carbon filled canister when canister purge valve 202 and canister vent valve are opened. Fresh air drawn in from atmosphere may cause fuel vapors to desorb from the carbon filled fuel vapor storage canister.

Referring now to FIG. 3, a schematic view of an igniter system 300 is shown. An igniter 3 for one cylinder of engine 10 is shown, but it should be appreciated that igniter system 300 may include one igniter 3 for each cylinder of engine 10.

Igniter system 300 may include an air compressor 301 that is configured to deliver pressurized air to injector 325 that is included in igniter 3 via check valve 302 and control valve 303. Igniter system 300 also includes a fuel tank 332 and a fuel pump 330 that may deliver fuel to injector 325. In this example, injector 325 injects air and fuel. However, in other examples, separate injectors may be provided for air and fuel. Igniter 3 also includes an ignition source 326 (e.g., a spark plug) for initiating combustion of an air-fuel mixture within pre-chamber 310. Combustion that is initiated in pre-chamber 310 may provide flame jets 312 that improve combustion stability for cylinder 31 when cylinder 31 combusts either rich or lean mixtures. For example, during purging of a fuel vapor storage canister, igniter 3 may be activated to initiate combustion of air-fuel mixtures in cylinder 31. If fuel vapors from purging the carbon filled canister enrichen the air-fuel mixture in cylinder 31, igniter 3 may operate to improve combustion in cylinder 31 via igniting the air-fuel mixture in cylinder 31 at multiple ignition cites that are generated from the flame jets that may emanate from orifices 366.

The system of FIGS. 1-3 provides for a vehicle system, comprising: an engine including an igniter that includes a pre-chamber; a fuel tank; a carbon filled fuel vapor storage canister in selective fluidic communication with the fuel tank; a canister purge valve; and a controller including executable instructions stored in non-transitory memory that cause the controller to increase an amount of fuel supplied via the igniter in response to purging fuel vapors from the carbon filled fuel vapor storage canister. In a first example, the vehicle system includes where purging fuel vapors includes opening the canister purge valve. In a second example that may include the first example, the vehicle system further comprises additional instructions that cause an amount of fuel supplied via the igniter to increase as a function of an amount of fuel vapor that is purged from the carbon filled fuel vapor storage canister. In a third example that may include one or both of the first and second examples, the vehicle system further comprises additional instructions to increase an amount of fuel delivered via the igniter in response to an indication of hydrocarbon breakthrough from the carbon filled fuel vapor storage canister. In a fourth example that may include one or more of the first through third examples, the vehicle system includes where the amount of fuel supplied via the igniter is supplied to the pre-chamber. In a fifth example that may include one or more of the first through fourth examples, the vehicle system further comprises additional executable instructions to supply air to the pre-chamber.

Referring now to FIG. 4, an example vehicle operating sequence according to the method of FIG. 5 is shown. The sequence of FIG. 4 may be provided via the system of FIGS. 1-3 according to the method of FIG. 5.

The first plot from the top of FIG. 4 is a plot of a carbon filled fuel vapor storage canister purge rate (e.g., grams/second) versus time. The vertical axis represents the purge rate of the carbon filled fuel vapor storage canister and the purge rate of the carbon filled fuel vapor storage canister increases in the direction of the vertical axis arrow. The horizontal axis represents time and time increases from the left side of the plot to the right side of the plot. Trace 402 represents the purge rate of the carbon filled fuel vapor storage canister.

The second plot from the top of FIG. 4 is a plot of a hydrocarbon breakthrough state indication versus time. The vertical axis represents the hydrocarbon breakthrough state indication for when hydrocarbons exit the carbon filled fuel vapor storage canister and move toward atmosphere. The hydrocarbons may exit the carbon filled fuel vapor storage canister when the carbon filled fuel vapor storage canister lacks capacity to store additional hydrocarbons and hydrocarbons are flowing into the carbon filled fuel vapor storage canister or are being liberated from the carbon filled fuel vapor storage canister. These hydrocarbons may be detected via a hydrocarbon sensor. The horizontal axis represents time and time increases from the left side of the plot to the right side of the plot. Trace 404 represents the hydrocarbon breakthrough state indication. Hydrocarbons are indicated as breaking through the carbon filled fuel vapor storage canister when trace 404 is at a higher level near the vertical axis arrow head. Hydrocarbons are not indicated as breaking through the carbon filled fuel vapor storage canister when trace 404 is at a lower level near the horizontal axis.

The third plot from the top of FIG. 4 is a plot of an igniter pre-chamber state indication versus time. The vertical axis represents the igniter pre-chamber state and the igniter is activated (e.g., operating as an ignition source) when trace 406 is at a higher level near the vertical axis arrow. The igniter is not activated when trace 406 is at a lower level near the horizontal axis. The horizontal axis represents time and time increases from the left side of the plot to the right side of the plot. Trace 406 represents the igniter pre-chamber state indication.

The fourth plot from the top of FIG. 4 is a plot of a carbon filled fuel vapor storage canister vapor concentration amount estimate (e.g., a concentration of hydrocarbons stored in the canister) versus time. The vertical axis represents the carbon filled fuel vapor storage canister vapor concentration amount estimate and the carbon filled fuel vapor storage canister vapor concentration amount estimate increases in the direction of the vertical axis arrow. The horizontal axis represents time and time increases from the left side of the plot to the right side of the plot. Trace 408 represents the carbon filled fuel vapor storage canister vapor concentration amount estimate.

The fifth plot from the top of FIG. 4 is a plot of a canister purge request (e.g., a request to purge or remove fuel vapors from the carbon filled fuel vapor storage canister) versus time. The vertical axis represents the canister purge request state and the canister purge request is asserted when trace 410 is at a higher level near the vertical axis arrow. The canister purge request is not asserted when trace 410 is at a lower level near the horizontal axis. The horizontal axis represents time and time increases from the left side of the plot to the right side of the plot. Trace 410 represents the canister purge request.

The sixth plot from the top of FIG. 4 is a plot of a pre-chamber charge mass (e.g., a mass of air and fuel introduced to the pre-chamber of an igniter) versus time. The vertical axis represents the pre-chamber charge mass and the pre-chamber charge mass increases in the direction of the vertical axis arrow. The horizontal axis represents time and time increases from the left side of the plot to the right side of the plot. Trace 412 represents the pre-chamber charge mass.

At time t0, hydrocarbons are not being purged from the carbon filled fuel vapor storage canister nor is there a request to do the same. Hydrocarbons are not breaking through the carbon filled fuel vapor storage canister and the igniters are not activated. The vehicle's engine is running (e.g., rotating and combusting fuel and air) (not shown) and the pre-chamber charge mass is zero. The carbon filled fuel vapor storage canister fuel vapor concentration level is low.

At time t1, a request to purge the carbon filled fuel vapor storage canister is generated. The request may be generated based on an amount of time since a last most recent purge of fuel vapors from the canister completed. Further, the request may be generated based on an estimate of fuel vapor stored in the canister and/or other conditions. The request to purge the carbon filled fuel vapor storage canister causes the engine's igniters to be activated to promote more robust combustion stability in the engine's cylinders. Hydrocarbon (HC) breakthrough is not indicated and the canister purge rate begins to increase. The pre-chamber charge mass is increased to a small amount to support activation of the igniters.

At time t2, hydrocarbon breakthrough occurs and the pre-chamber charge mass is increased so that a greater canister purge rate may be supported, thereby increasing the possibility of a higher level of combustion stability during purging of fuel vapors from the carbon filled fuel vapor storage canister. The canister purge flow rate is increased to reduce a possibility of additional hydrocarbon vapors being released to the atmosphere. The carbon filled fuel vapor storage canister hydrocarbon concentration has increased to a higher level and purging remains active.

At time t3, the hydrocarbon breakthrough ceases, but the carbon filled fuel vapor storage canister continues to be purged of fuel vapors. The canister purge flow rate remains high and the canister purge request remains active. The igniters remain activated and the pre-chamber charge mass remains at a higher level. Between time t3 and time t4, the carbon filled fuel vapor storage concentration falls and the engine's igniters are deactivated when the fuel vapor storage fuel vapor concentration falls below a threshold level. The canister purge level remains activated and the pre-chamber charge mass is reduced in response to the concentration of fuel vapor stored in the carbon filled canister being reduced.

At time t4, the request to purge the carbon filled fuel vapor storage canister of fuel vapors is withdrawn and the canister purge rate is reduced to zero in response to withdrawing the purging request. There is no hydrocarbon breakthrough and the igniters are deactivated. The carbon filled fuel vapor storage canister vapor concentration is low and the pre-chamber charge mass is zero.

In this way, the pre-chamber charge mass may be adjusted as a function of carbon filled fuel vapor storage canister flow rate and concentration of fuel vapor in the carbon filled fuel vapor storage canister. Further, the igniters may be activated and deactivated in response to hydrocarbon breakthrough of the carbon filled fuel vapor storage canister to improve combustion stability and reduce engine emissions.

Referring now to FIG. 5, an example method 500 for operating a vehicle that includes an evaporative emissions system is shown. At least portions of method 500 may be included in and cooperate with a system as shown in FIGS. 1-3 as executable instructions stored in non-transitory memory. The method of FIG. 5 may cause the controller to actuate the actuators in the real world and receive data and signals from sensors described herein when the method is realized as executable instructions stored in controller memory.

At 502, method 500 determines vehicle operating conditions. Vehicle operating conditions may include but are not limited to an estimate of fuel vapors stored in a carbon filled fuel vapor storage canister, ambient temperature, ambient pressure, engine speed, engine load, and engine operating state. Method 500 proceeds to 504.

At 504, method 500 judges if conditions are present for purging the carbon filled fuel vapor storage canister of fuel vapors. Conditions may include but are not limited to the amount of fuel vapor being stored in the canister exceeding a threshold amount, an amount of time since a last most recent time that fuel vapors where purged from the fuel vapor storage canister exceeding a threshold amount of time, a concentration of fuel vapors stored in the carbon filled fuel vapor storage canister, and a manual request to purge the carbon filled fuel vapor storage canister. The concentration of fuel vapors in the carbon filled fuel vapor storage canister may be based on an amount of fuel that is added to a fuel tank. If method 500 judges that conditions are present for purging the carbon filled fuel vapor storage canister, the answer is yes and method 500 proceeds to 506. Otherwise, the answer is no and method 500 proceeds to exit.

At 506, method 500 begins to purge fuel vapors from the carbon filled fuel vapor storage canister. The carbon filled fuel vapor storage canister may be purged by opening the canister purge valve and the canister vent valve while the vehicle's engine is running (e.g., rotating and combusting air and fuel). Method 500 proceeds to 508.

At 508, estimates a concentration of fuel entering the engine via the carbon filled fuel vapor storage canister. In one example, method 700 includes a closed loop proportional and integral (PI) controller to adjust an equivalence ratio of the engine (e.g., Lambda) based on feedback from an oxygen sensor such that the equivalence ratio oscillates about a stoichiometric air-fuel ratio (e.g., λ=1) during nominal engine operating conditions (e.g., the engine is at operating temperature and operating within a predetermined speed and load range). The PI controller outputs a variable Lambse that represents the engine's desired Lambda value. Method 500 determines a desired engine fuel amount (Fd), or alternatively, a desired engine air amount (MAF) based on a driver demand torque or power. The desired engine fuel amount or desired engine air amount may be determined via functions or via look-up tables and the other of the two values (e.g., the air amount or the fuel amount) may be determined via the following equation:

$$F_d = \frac{MAF}{Lambse \cdot AFd} \quad \text{eq. (1)}$$

where Fd is the engine fuel amount or desired engine fuel amount, MAF is the engine air amount or desired engine air amount, Lambse is the output of the PI controller, and AFd is the desired engine air-fuel ratio. Method 500 supplies fuel to the engine via the carbon filled fuel vapor storage canister and method 500 adjusts the amount of fuel injected in response to the concentration of fuel vapors stored in the carbon filled fuel vapor storage canister. In particular, method 500 may determine the concentration of fuel entering the engine via the following equation:

$$p\_comp = \frac{(Lambse(k) - 1) + (Lambse(k+1) - 1)}{2} \cdot dt + p\_comp\_old \quad \text{eq. (2)}$$

where p_comp is the learned concentration of fuel entering the engine via the carbon filled fuel vapor storage canister, Lambse is the requested engine equivalence ratio, k is the $k^{th}$ Lambse value, k+1 is the $k^{th}+1$ Lambse value, dt is the amount of time between Lambse samples, and p_comp_old is the last most recent value of p_comp. Equation 2 may be determined each time method 500 is executed so that p_comp is the integrated value of Lambse −1. Initially, the value of p_comp_old may be set to zero or an inferred value. The variable p_comp_old is set equal to the value of p_comp once the value of p_comp has been determined. The amount of fuel delivered to the engine may be determined via the following equation:

$$F_{dmod} = F_d - p\_comp \quad \text{eq. (3)}$$

where $F_{dmod}$ is the desired modified fuel amount that is to be delivered to the engine, Fa is the desired amount of fuel to be supplied to the engine, and p_comp is the concentration of fuel entering the engine from the carbon filled fuel vapor storage canister. The amount of fuel injected to the engine may be adjusted via adjusting the engine's fuel injectors to deliver the amount of fuel $F_{dmod}$. Thus, the amount of fuel injected to engine cylinders may decrease as the value of p_comp increases. Method 500 proceeds to 510.

At 510, method 500 activates the engine's igniters. The igniters may be activated by suppling one or more of fuel, air, and spark to a pre-chamber of each igniter. In one example, an amount of charge (e.g., air and fuel mass) delivered to the pre-chamber of an igniter may be a predetermined fixed amount value, or alternatively, an amount value that varies with engine speed and engine load. For example, at higher engine speeds and loads, a greater amount of charge may be supplied to the pre-chamber of the igniter as compared to when the engine is operated at a lower speed and lower load. By activating the igniters, combustion stability of engine cylinders may be improved, especially when a cylinder is operating lean or rich. In still other examples, the amount of fuel that is injected to the pre-chamber of igniters may be a function of a concentration and flow rate of fuel vapors that are entering the engine. Method 500 proceeds to 512.

At 512, method 500 judges whether or not the canister purge valve (e.g., 202 of FIG. 2) is fully open. If so, the answer is yes and method 500 proceeds to 516. Otherwise, the answer is no and method 500 proceeds to 514.

At 514, method 500 incrementally opens the canister purge valve from its present position. For example, if the canister purge valve is open zero percent, method 500 may open the canister purge value to five percent of the canister purge valves fully open position. Alternatively, if the canister purge valve is a pulse width modulated valve, it may be commanded to be open for five percent of a predetermined amount of time. For example, the canister purge valve may be opened for 50 milliseconds for every second the canister purge valve is operated. Method 500 proceeds to 516 after incrementally opening the canister purge valve.

At 516, method 500 judges whether or not there is hydrocarbon breakthrough from the carbon filled fuel vapor storage canister. In other words, method 500 judges whether or not hydrocarbons are flowing from the carbon filled fuel vapor canister toward atmosphere via the canister vent valve (e.g., 206 of FIG. 2). In one example, method 500 may judge that there is hydrocarbon breakthrough when a concentration of hydrocarbons in conduit or passage 256 is greater than a threshold concentration. If so, the answer is yes and method 500 proceeds to 530. Otherwise, the answer is no and method 500 proceeds to 518.

At 518, method 500 judges whether or not the carbon filled fuel vapor canister is purged of fuel vapors. In one example, method 500 judges that the carbon filled fuel vapor canister is purged when the value of p_comp is zero or when an amount of hydrocarbons entering the engine is less than a threshold amount. The hydrocarbon concentration may be determined via a hydrocarbon sensor. If method 500 judges that the carbon filled fuel vapor canister is purged of fuel vapors, then the answer is yes and method 500 proceeds to 520. Otherwise, the answer is no and method 500 returns to 508.

At 520, method 500 fully closes the canister purge valve and deactivates the engine's igniters. The igniters may be deactivated by ceasing to supply the igniters with spark, fuel, and air. Additionally, method 500 may fully open the canister vent valve to allow fuel vapors to be stored in the carbon filled fuel vapor storage canister. Method 500 proceeds to exit.

At 530, method 500 increases a mass of fuel and/or air entering the pre-chamber of the engine's igniters. In one example, method 500 may increase the fuel mass and the air mass entering the pre-chamber of each igniter via the following equations:

$$Ignitam = f(fvc, fvf, load, n) \quad \text{eq. (4)}$$

$$Ignitfm = g(fvc, fvf, load, n) \quad \text{eq. (5)}$$

where Ignitam is the igniter air mass (e.g., the mass of air injected to the igniter pre-chamber), f is a function that returns the igniter air mass, fvc is the concentration of fuel vapors exiting the carbon filled fuel vapor storage canister, fvf is the flow rate of gases from the carbon filled fuel vapor storage canister, load is engine load, n is engine speed, Ignitfm is the igniter fuel mass (e.g., a mass of fuel injected to the igniter pre-chamber), and g is a function that returns the igniter fuel mass. The functions f and g may reference tables or functions to determine values for Ignitam and Ignitfm. In one example, the fuel mass and air mass injected to the pre-chambers of igniters increases with increased flow rates and concentrations of fuel leaving the carbon filled fuel vapor storage canister and entering the engine. This may provide increased combustion stability and lower emissions by increasing the fraction of fuel that is combusted in engine cylinders during purging of the carbon filled canister. The fuel and air are combusted in the pre-chamber by providing a spark to the pre-chamber. Method 500 proceeds to 532.

At 532, method 500 incrementally opens the canister purge valve so that the canister purge flow rate may be increased to hasten purging of the carbon filled fuel vapor storage canister. The canister purge flow rate may be increased even during hydrocarbon breakthrough of the carbon filled fuel vapor storage canister because increasing the flow rate of fuel and air into the igniter may increase combustion stability of the engine. Method 500 returns to 508.

In this way, method 500 may improve combustion stability of an engine that is consuming fuel vapors that are purged from a carbon filled fuel vapor storage canister. The igniters may be activated in response to purging of fuel vapors or in response to hydrocarbon breakthrough of a carbon filled fuel vapor storage canister.

The method of FIG. 5 provides for a method for operating a vehicle, comprising: via a controller, increasing an amount of fuel that is supplied via an igniter in response to purging fuel vapors from a carbon filled canister, and where the igniter includes a pre-chamber. In a first example, the method further comprises increasing an amount of air that is supplied to the igniter that includes the pre-chamber in response to purging fuel vapors from the carbon filled canister. In a second example that may include the first example, the method includes where purging fuel vapors from the carbon filled canister is performed in response to a canister purge request. In a third example that may include one or both of the first and second examples, the method includes where the canister purge request is based on a concentration of fuel vapors stored in the carbon filled canister. In a fourth example that may include one or more of the first through third examples, the method includes where the concentration is estimated based on an amount of fuel added to a fuel tank. In a fifth example that may include one or more of the first through fourth examples, the method further comprises reducing an amount of fuel injected to an engine cylinder in response to purging fuel vapors from the carbon filled canister. In a sixth example that may include one or more of the first through fifth examples, the method further comprises opening a canister purge valve in response a request to purge fuel vapors from the carbon filled canister. In a seventh example that may include one or more of the first through sixth examples, the method further comprises combusting the amount of fuel that is supplied to the igniter via generating a spark within the igniter. In an eighth example that may include one or more of the first through seventh examples, the method further comprises ceasing combustion via the igniter in response to an indication of the carbon filled canister being purged of fuel vapors.

The method of FIG. 5 also provides for a method for operating a vehicle, comprising: via a controller, increasing an amount of fuel that is supplied via an igniter in response to an indication of hydrocarbon breakthrough of a carbon filled canister, and where the igniter includes a pre-chamber. In a first example, the method includes where the amount of fuel is delivered to the pre-chamber. In a second example that may include the first example, the method further comprises increasing an amount of air that is supplied via the igniter in response to the indication of hydrocarbon breakthrough. In a third example that may include one or both of the first and second examples, the method includes where the indication of hydrocarbon breakthrough is provided via a hydrocarbon sensor. In a fourth example that may include one or more of the first through third examples, the method further comprises igniting an air-fuel mixture in an engine cylinder via the igniter.

Note that the example control and estimation routines included herein can be used with various engine and/or vehicle system configurations. Further, the methods described herein may be a combination of actions taken by a controller in the physical world and instructions within the controller. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller This concludes the description. The reading of it by those skilled in the art would bring to mind many alterations and modifications without departing from the spirit and the scope of the description. For example, I3, I4, I5, V6, V8, V10, and V12 engines operating in natural gas, gasoline, diesel, or alternative fuel configurations could use the present description to advantage.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for operating a vehicle, comprising:
via a controller, increasing an amount of fuel that is supplied via an igniter in response to purging fuel vapors from a carbon filled canister, and where the igniter includes a pre-chamber.

2. The method of claim 1, further comprising increasing an amount of air that is supplied to the igniter that includes the pre-chamber in response to purging fuel vapors from the carbon filled canister.

3. The method of claim 1, where purging fuel vapors from the carbon filled canister is performed in response to a canister purge request.

4. The method of claim 3, where the canister purge request is based on a concentration of fuel vapors stored in the carbon filled canister.

5. The method of claim 4, where the concentration is estimated based on an amount of fuel added to a fuel tank.

6. The method of claim 1, further comprising reducing an amount of fuel injected to an engine cylinder in response to purging fuel vapors from the carbon filled canister.

7. The method of claim 1, further comprising opening a canister purge valve in response a request to purge fuel vapors from the carbon filled canister.

8. The method of claim 1, further comprising combusting the amount of fuel that is supplied to the igniter via generating a spark within the igniter.

9. The method of claim 1, further comprising ceasing combustion via the igniter in response to an indication of the carbon filled canister being purged of fuel vapors.

10. A vehicle system, comprising:

an engine including an igniter that includes a pre-chamber;

a fuel tank;

a carbon filled fuel vapor storage canister in selective fluidic communication with the fuel tank;

a canister purge valve; and a controller including executable instructions stored in non-transitory memory that cause the controller to increase an amount of fuel supplied via the igniter in response to purging fuel vapors from the carbon filled fuel vapor storage canister.

11. The vehicle system of claim 10, where purging fuel vapors includes opening the canister purge valve.

12. The vehicle system of claim 10, further comprising additional instructions that cause an amount of fuel supplied via the igniter to increase as a function of a concentration of fuel vapor that is purged from the carbon filled fuel vapor storage canister.

13. The vehicle system of claim 10, further comprising additional instructions to increase an amount of fuel delivered via the igniter in response to an indication of hydrocarbon breakthrough from the carbon filled fuel vapor storage canister.

14. The vehicle system of claim 13, where the amount of fuel supplied via the igniter is supplied to the pre-chamber.

15. The vehicle system of claim 14, further comprising additional executable instructions to supply air to the pre-chamber.

16. A method for operating a vehicle, comprising:

via a controller, increasing an amount of fuel that is supplied via an igniter in response to an indication of hydrocarbon breakthrough of a carbon filled canister, and where the igniter includes a pre-chamber.

17. The method of claim 16, where the amount of fuel is delivered to the pre-chamber.

18. The method of claim 17, further comprising increasing an amount of air that is supplied via the igniter in response to the indication of hydrocarbon breakthrough.

19. The method of claim 16, where the indication of hydrocarbon breakthrough is provided via a hydrocarbon sensor.

20. The method of claim 16, further comprising igniting an air-fuel mixture in an engine cylinder via the igniter.

* * * * *